US012674733B2

(12) United States Patent
Murphy et al.

(10) Patent No.: US 12,674,733 B2
(45) Date of Patent: Jul. 7, 2026

(54) ELECTRICAL HARNESS FLEXIBILITY MEASUREMENT DEVICE

(71) Applicant: GM GLOBAL TECHNOLOGY OPERATIONS LLC, Detroit, MI (US)

(72) Inventors: Brenden Murphy, Sterling Heights, MI (US); Frank Ryan Kuehnl, Pinckney, MI (US); Ronald J. Jones, Pinckney, MI (US); Marissa Fischer, Kirkwood, MO (US); Aristotle Economon, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 296 days.

(21) Appl. No.: 18/631,697

(22) Filed: Apr. 10, 2024

(65) Prior Publication Data

US 2025/0321171 A1      Oct. 16, 2025

(51) Int. Cl.
*G01N 3/20* (2006.01)
*G01N 3/04* (2006.01)

(52) U.S. Cl.
CPC ................ *G01N 3/20* (2013.01); *G01N 3/04* (2013.01)

(58) Field of Classification Search
None
See application file for complete search history.

(56) References Cited

U.S. PATENT DOCUMENTS 2,777,322 A * 1/1957 Weber ...................... G01N 3/20
73/854

FOREIGN PATENT DOCUMENTS

| CN | 204086037 U | | 1/2015 | |
| CN | 113155596 B | * | 7/2022 | ............... G01N 3/20 |
| DE | 3819980 A1 | | 5/1989 | |
| JP | 2014228333 A | * | 12/2014 | |
| JP | 2018072047 A | * | 5/2018 | |

OTHER PUBLICATIONS

German Office Action from counterpart DE1020241130776, dated Jan. 3, 2025.

* cited by examiner

*Primary Examiner* — Daniel S Larkin

(57) ABSTRACT

A device configured to measure flexibility of a wire harness. The device includes: a base including a first retention member configured to hold the wire harness; an arm pivotably connected to the base at a hinge, the arm including a second retention member configured to hold the wire harness; an interface of the arm, the interface configured to cooperate with an actuator such that rotation of the interface by the actuator rotates the arm relative to the base at the hinge and bends the wire harness mounted to the device; and a gauge configured to identify an angular position of the arm relative to the base corresponding to a degree of bend of the wire harness.

20 Claims, 5 Drawing Sheets

ELECTRICAL HARNESS FLEXIBILITY MEASUREMENT DEVICE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a device configured to measure flexibility of a wire harness.

A wire harness includes an assembly of wires and cables within a flexible housing for transmitting electrical signals and/or power. The wire harness simplifies connections to larger components by integrating the wires and cables into a single unit for "drop-in" installation. Vehicles, machinery, and other equipment often require extensive wiring. A wire harness streamlines manufacturing by consolidating various wires and cables into a single assembly. Installation becomes a matter of "dropping in" the harness rather than dealing with individual wires. The wire harness is typically flexible to allow it to extend around corners and/or across curved surfaces.

SUMMARY

The present disclosure includes, in various features, a device configured to measure flexibility of a wire harness. The device includes: a base including a first retention member configured to hold the wire harness; an arm pivotably connected to the base at a hinge, the arm including a second retention member configured to hold the wire harness; an interface of the arm, the interface configured to cooperate with an actuator such that rotation of the interface by the actuator rotates the arm relative to the base at the hinge and bends the wire harness mounted to the device; and a gauge configured to identify an angular position of the arm relative to the base corresponding to a degree of bend of the wire harness.

In further features, the hinge includes a pin in cooperation with the base and the arm.

In further features, the interface is aligned with an axis of rotation of the arm about which the arm pivots relative to the base.

In further features, the interface is aligned with the hinge.

In further features, the interface includes a bolt.

In further features, the interface is in cooperation with the arm by way of a tab connected to the arm.

In further features, the actuator includes a torque wrench.

In further features, the gauge includes a first portion fixedly mounted to the base and a second portion fixedly mounted to the arm, the second portion rotates with the arm and points to markings on the first portion identifying the angular position of the arm relative to the base.

In further features, the first retention member is movable along a first track of the base, the first retention member including a first lock configured to lock the first retention member at any suitable position along the first track.

In further features, the second retention member is movable along a second track of the arm, the second retention member including a second lock configured to lock the second retention member at any suitable position along the second track.

In further features, a platform is configured to be positioned adjacent to the arm and support a portion of the wire harness thereon, the platform including rollers on an under-surface thereof.

The present disclosure also includes, in various features, a device configured to measure flexibility of a wire harness. The device includes: a base including a first retention member configured to hold the wire harness; an arm pivotably connected to the base at a hinge, an axis of rotation of the arm extends along the hinge, the arm including a second retention member configured to hold the wire harness; an interface mounted to the arm and aligned with the axis of rotation of the arm, the interface configured to cooperate with an actuator such that rotation of the interface by the actuator rotates the arm relative to the base at the hinge and bends the wire harness mounted to the device; and a gauge including a meter mounted to the base and a pointer mounted to the arm, rotation of the arm relative to the base about the axis of rotation moves the pointer relative to the meter for identification of an angular position of the arm relative to the base corresponding to a degree of bend of the wire harness.

In further features, the interface includes a bolt and the actuator includes a torque wrench.

In further features, the first retention member is movable along a first track of the base, the first retention member including a first lock configured to lock the first retention member at any suitable position along the first track; and the second retention member is movable along a second track of the arm, the second retention member including a second lock configured to lock the second retention member at any suitable position along the second track.

In further features, a platform is configured to be positioned adjacent to the arm and support a portion of the wire harness thereon, the platform including rollers on an under-surface thereof.

The present disclosure further includes, in various features, a method for measuring flexibility of a wire harness. The method includes: coupling the wire harness to a base of a device configured to measure flexibility of the wire harness with a first retention member; coupling the wire harness to an arm of the device with a second retention member, the arm pivotably connected to the base at a hinge of the device; rotating the arm relative to the base to bend the wire harness mounted to the device including increasing a degree of rotation of the arm relative to the base until a force required to rotate the arm and bend the wire harness reaches a predetermined limit; and stopping rotation of the arm relative to the base when the force reaches the predetermined limit, and referencing a gauge of the device to identify an angular position of the arm relative to the base corresponding to a degree of bend of the wire harness.

In further features, the method includes rotating the arm relative to the base with an actuator in cooperation with the arm by way of an interface of the arm.

In further features, the interface includes a bolt.

In further features, the actuator includes a torque wrench.

In further features, the method includes identifying the force required to rotate the arm on a meter that measures torque applied to the torque wrench.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A wire harness, also known as a cable harness, wiring assembly, or wiring loom, is a structured set of wires, cables, and connectors that are bound together to transmit electrical power and signals efficiently. The wire harness organizes and protects electrical wires and cables from damage due to abrasion, moisture, or other environmental factors, for example. Wire harnesses are commonly used in various industries including automotive, aerospace, electronics, and telecommunications, among others. They can range from simple arrangements of a few wires to complex assemblies with hundreds or even thousands of wires, depending on the application. Wire harnesses have traditionally been defined as stiff or flexible largely based on subjective assessments made by individual operators. The present disclosure provides the ability to perform objective and repeatable flexibility measurements on wire harnesses. The devices and methods of the present disclosure may be used on a factory floor on a full production intent harness, for example. There is thus no need to cut a full wire harness into individual segments to test the individual segments.

The present disclosure includes devices and methods for measuring flexibility of a wire harness. A specified torque is applied to the wire harness, and the resulting degrees of deflection is measured. A less flexible wire harness will deflect to a smaller degree than a more flexible wire harness in response to the same amount of force being applied. The present disclosure applies to wire harnesses used in any application, such as automotive and non-automotive applications.

Figure 1:
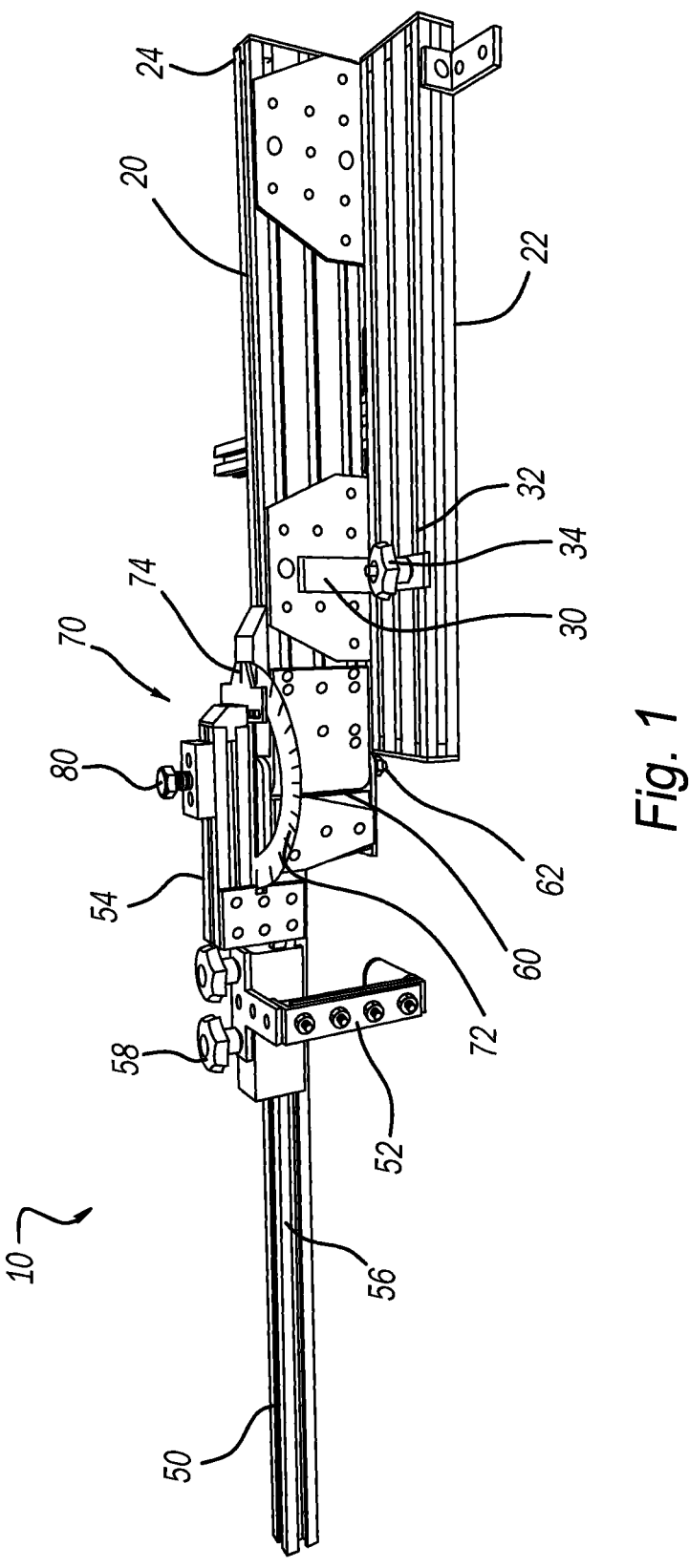
FIG. 1 is a perspective view of an exemplary device in accordance with the present disclosure configured to measure flexibility of a wire harness.
Figure 2:
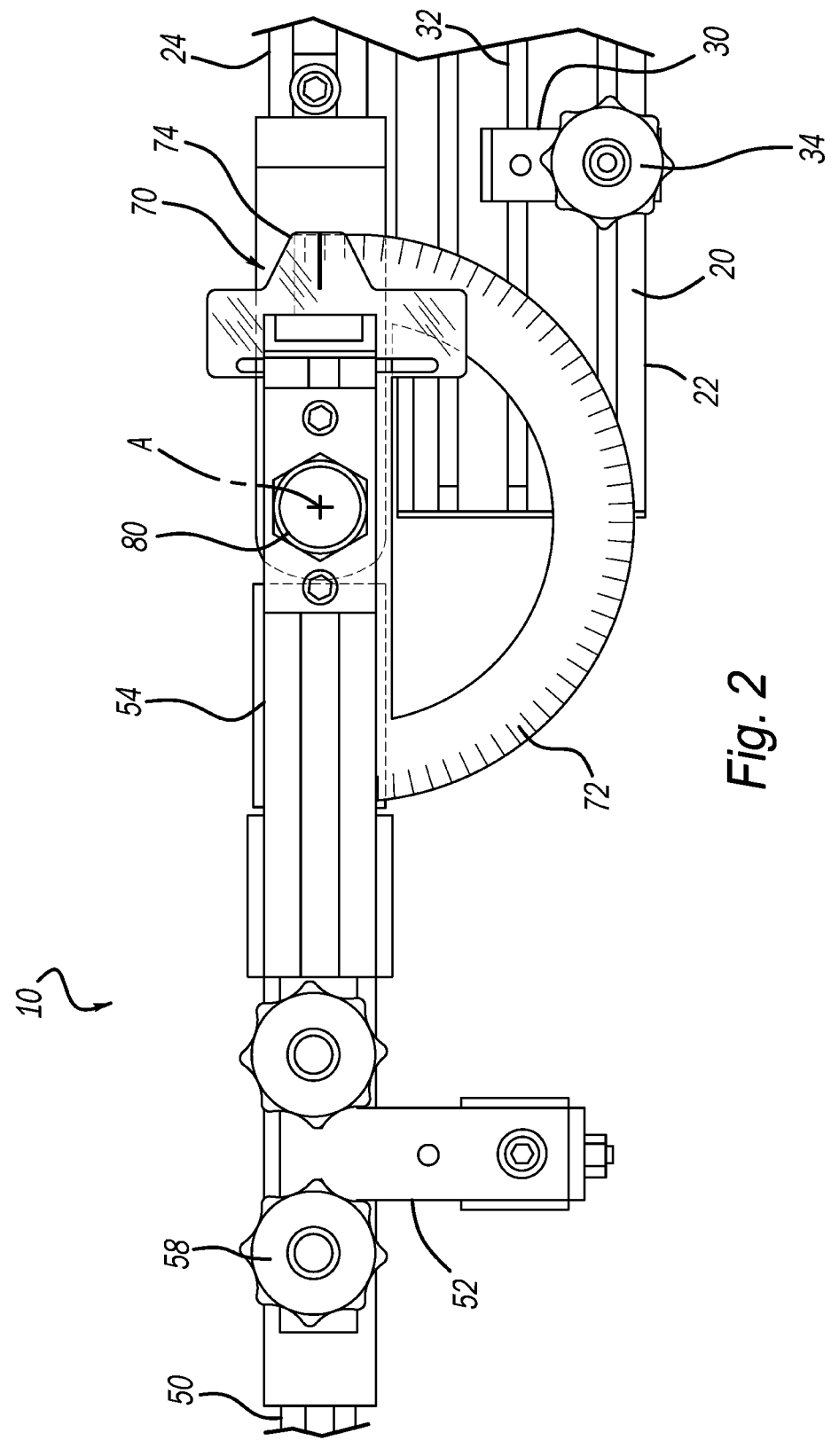
FIG. 2 is a top plan view of the device of FIG. 1.
Figure 3A:
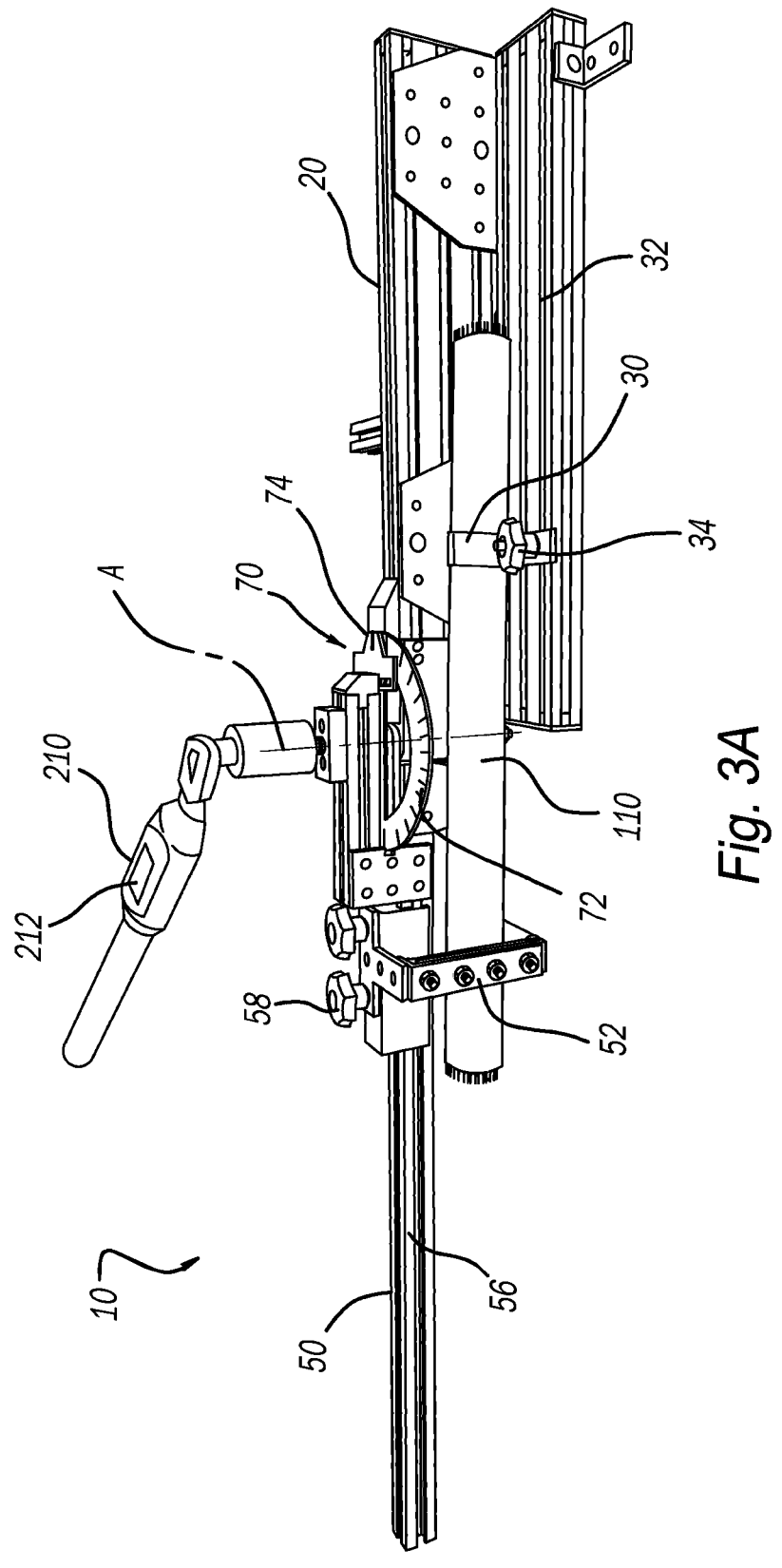
FIG. 3A is a perspective view of the device of FIG. 1 with a wire harness coupled thereto, the device and the wire harness are both illustrated in a linear orientation.
Figures 3B, 3C:
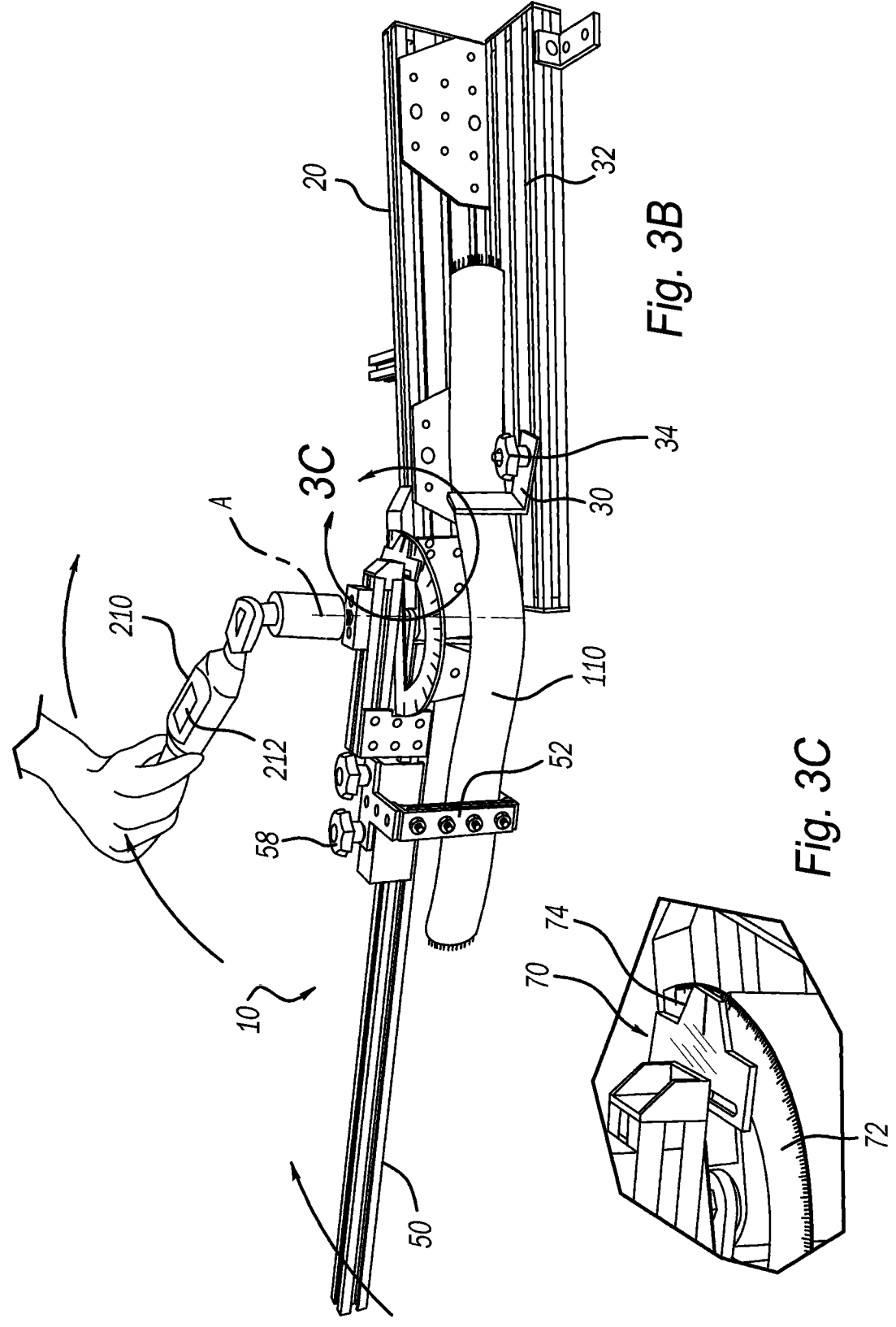
FIG. 3B is a perspective view of the device of FIG. 1 with the wire harness coupled thereto, an arm of the device is rotated relative to a base to assess flexibility of the wire harness.
FIG. 3C illustrates area 3C of FIG. 3B.
Figure 4:
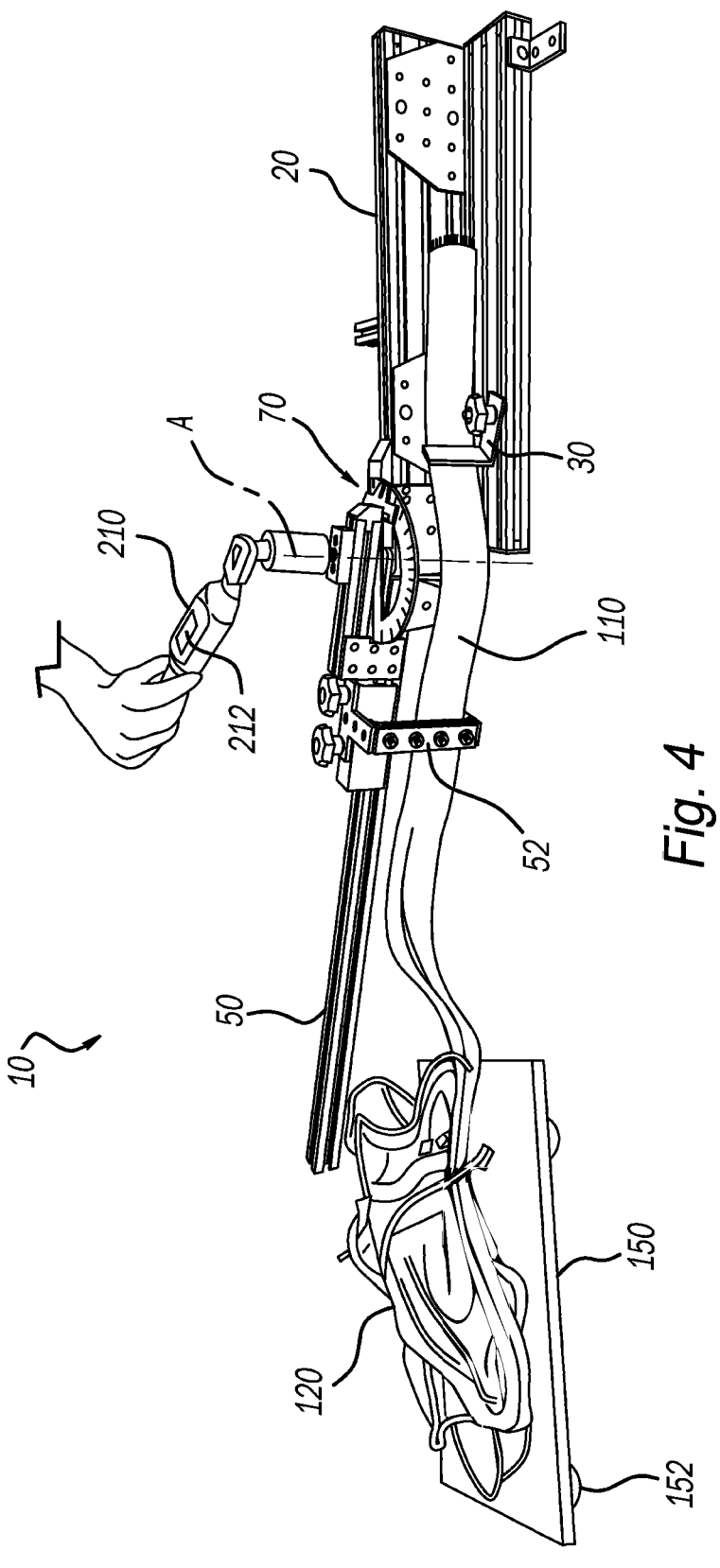
FIG. 4 is a perspective view of the device of FIG. 1 with a full wire harness coupled thereto, a distal portion of the wire harness is supported by a movable platform.

FIG. 1 illustrates an exemplary device 10 in accordance with the present disclosure configured to measure flexibility of any suitable wire harness, such as the wire harness 110 of FIGS. 3A, 3B, and 4. For example, the device 10 generally includes a base 20 and an arm 50, which is pivotally connected to the base 20 at a hinge 60. An axis of rotation A (FIGS. 2, 3A, 3B and 4, for example) extends along the hinge 60. The hinge 60 includes a pin 62, which cooperates with both the base 20 and the arm 50.

The base 20 generally includes a first portion 22 and a second portion 24, which in the example illustrated are generally arranged at a right-angle relative to each other. The base 20 may be configured in any other suitable manner to retain the wire harness 110. The first portion 22 includes a first retention member 30 configured to hold the wire harness 110 against the base 20. The first retention member 30 is slidably movable along a track 32 defined by the first portion 22. The first retention member 30 may be locked at any suitable position along the track 32 by actuation of a locking member 34 configured to lock the first retention member 30 in the track 32. The first retention member 30 may be any suitable clamp or other retention device configured to hold the wire harness 110.

The arm 50 includes a second retention member 52 configured to hold the wire harness 110 to the arm 50. The second retention member 52 is slidable along a track 56 of the arm 50. The second retention member 52 includes a locking member 58 configured to lock the second retention member 52 in the track 56. The second retention member 52 may be any suitable retention flange or other retention member configured to hold the wire harness 110.

The device 10 further includes a gauge 70. FIGS. 2 and 3C illustrate the gauge 70 in detail. The gauge 70 is configured to identify an angular position of the arm 50 relative to the base 20, which corresponds to a degree of bend of the wire harness 110 mounted to the base 20. The gauge 70 includes a meter 72 and a pointer 74. The meter 72 is fixedly mounted to the base 20, particularly to the second portion 24 of the base 20. The pointer 74 rotates with the arm 50. The pointer 74 may be directly connected to the arm 50 or indirectly connected to the arm by way of a connection tab 54. The meter 72 includes a plurality of measuring marks, similar to or the same as a protractor. The pointer 74 includes a reference line that points to different marks on the meter 72 as the arm 50 rotates about the hinge 60 and the axis of rotation A to identify the angle that the arm 50 has been rotated to relative to the base 20.

The device 10 further includes an interface 80. Rotation of the interface 80 rotates the arm 50 relative to the base. The interface 80 may be configured in any suitable manner for coupling with any suitable actuator. Rotation of the interface 80 using the actuator rotates the arm 50 relative to the base 20. Any suitable actuator may be included, such as an actuator 210, which is illustrated in FIGS. 3A, 3B, and 4 as a torque wrench. The interface 80 may be configured as a bolt as illustrated. The interface 80 may alternatively take the form of any suitable flange, knob, connector, surface of the arm 50, etc. configured to cooperate with any suitable actuator configured to rotate the arm 50. Thus, cooperation between the actuator 210 in the form of a torque wrench and the interface 80 in the form of the bolt allows the bolt to be rotated by the torque wrench, which rotates the arm 50 relative to the base 20.

With continued reference to FIGS. 1 and 2, and additional reference to FIGS. 3A and 3B, an exemplary method of using the device 10 to assess flexibility of the wire harness 110 will now be described. The wire harness 110 is mounted to the device 10 with the first retention member 30 and the second retention member 52. The position of the first retention member 30 along the base 20 and the position of the second retention member 52 along the arm 50 are set to replicate a distance between attachment points of the wire harness 110 at an installation site. The wire harness 110 is also mounted to the device 10 to arrange a bend location of the wire harness 110 opposite to the hinge 60 and simulate an environment where the wire harness 110 is intended to be installed. The wire harness 110 is initially mounted with the arm 50 aligned linearly with the base 20 (see FIG. 3A), such that the angular position of the arm 50 relative to the base 20 as read on the gauge 70 is zero degrees (0°).

With the wire harness 110 mounted to the device 10, the arm 50 is rotated at the hinge 60 about the axis of rotation A by rotating the interface 80. In the example illustrated, the actuator 210 is in the form of a torque wrench that is coupled to the interface 80, which is configured as a bolt. Rotation of the torque wrench rotates the interface 80, which rotates the arm 50 and bends the wire harness 110. The torque wrench is slowly rotated with gradually increased torque to bend the wire harness 110. The wrench is rotated by any suitable operator until the amount of torque to bend the wire harness 110 reaches a predetermined torque limit as measured by the torque wrench. The torque wrench may be configured to show the amount of torque being applied on a meter 212, which may be configured as a display.

The predetermined torque limit may be determined in any suitable manner, and will typically depend on the type of the wire harness 110 and the installation location. The torque limit may be set according to acceptable industry standards, such as, but not limited to, the Manufacturing Ergonomics, Criterion for Power and Signal Distribution Systems (MFGERGO). For example, according MFGERGO-18 the torque limit may be 3.0 Nm/26.5 in/lbs. (1.0 Nm=8.85 in/lbs. and 1 Nm=0.74 lbf). The torque limit generally corresponds to the limit of an acceptable amount of force that may be applied to the wire harness 110 by the user to bend the wire harness 110 when installing the wire harness 110, such as to fit a corner or curve, that will not place an undue amount of strain on the installer. The torque wrench or any other suitable actuator 210 may be set to generate an alert when the torque limit is reached.

When the torque limit is reached, rotation of the arm 50 is stopped and the gauge 70 is referenced to identify an angular position of the arm 50 relative to the base 20, which corresponds to a degree of bend of the wire harness 110. More specifically and as illustrated in FIG. 3C, for example, rotation of the arm 50 moves the pointer 74 along the meter 72. The meter 72 includes markings similar to a protractor, which identify degrees of rotation from 0°. In the position of FIG. 3A, the pointer 74 points to 0° on the meter 72. In the position of FIGS. 3B and 3C, the pointer 74 points to a degree greater than 0° corresponding to the degree of rotation of the arm 50 from the position of FIG. 3A. In the example of FIGS. 3B and 3C, the arm 50 may have rotated, for example, 10° from zero and thus the pointer 74 may point to a 10° marking on the meter 72.

The degree of rotation of the arm 50 relative to the base 20 as indicated on the gauge 70 is compared to a degree that the wire harness 110 must be bent to be installed at an installation site. If the amount of torque required to bend the wire harness 110 to fit the installation site is equal to, or less than, the predetermined limit, then the flexibility of the wire harness 110 is determined to be acceptable for the installation site. If the amount of torque required to bend the wire harness 110 to fit the installation site is greater than the predetermined limit, then the flexibility of the wire harness 110 is determined to be unacceptable for the installation site. In other words, for the particular wire harness 110 tested, an installer would need to apply more than an acceptable amount of torque to install the wire harness 110 at the installation site, which may undesirably place an undue amount of strain on the installer and/or the wire harness 110. Under such circumstances, a more flexible wire harness would be selected for the installation site.

The device 10 is configured to assess the flexibility of a select region of the wire harness 110, as illustrated in FIGS. 3A and 3B for example, or on a full wire harness as illustrated in FIG. 4. FIG. 4 illustrates a full wire harness 110 mounted to the device 10, with a distal end 120 of the wire harness 110 seated on a platform 150 with rollers 152. The platform 150 supports the distal end 120 and allows the distal end to freely move along a surface to eliminate any friction between the distal end 120 and the surface, which may result in a false torque reading at the actuator 210. The rollers 152 may be replaced with any suitable features configured to allow the platform 150 to slide along the base with as little friction as possible.

The device 10 and the method of use described above is generally a manual operation whereby an operator physically rotates the arm 50 relative to the base 20 by manually applying torque with the actuator 210. The present disclosure also includes automated operation of the device 10 and automated application of torque. For example and with respect to the actuator 210, instead of a torque wrench that a user must manually apply torque to, the actuator may take the form of an automated device. Any suitable automated device may be included, such as a robotic arm or any other suitable automated system configured to apply torque to the device to rotate the arm 50 until the predetermined torque limit is reached. The gauge 70 may also be automated. For example, the meter 72 and the pointer 74 may be replaced with any suitable automated device configured to identify degree of rotation of the arm 50 relative to the base 20 once the amount of torque required to rotate the arm 50 (and bend the wire harness 110) exceeds the predetermined limit.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A device configured to measure flexibility of a wire harness, the device comprising:
   a base including a first retention member configured to hold the wire harness;
   an arm pivotably connected to the base at a hinge, the arm including a second retention member configured to hold the wire harness;
   an interface of the arm, the interface configured to cooperate with an actuator such that rotation of the interface by the actuator rotates the arm relative to the base at the hinge and bends the wire harness mounted to the device; and
   a gauge configured to identify an angular position of the arm relative to the base corresponding to a degree of bend of the wire harness.

2. The device of claim 1, wherein the hinge includes a pin in cooperation with the base and the arm.

3. The device of claim 1, wherein the interface is aligned with an axis of rotation of the arm about which the arm pivots relative to the base.

4. The device of claim 3, wherein the interface is aligned with the hinge.

5. The device of claim 1, wherein the interface includes a bolt.

6. The device of claim 1, wherein the interface is in cooperation with the arm by way of a tab connected to the arm.

7. The device of claim 1, wherein the actuator includes a torque wrench.

8. The device of claim 1, wherein the gauge includes a first portion fixedly mounted to the base and a second portion fixedly mounted to the arm, the second portion rotates with the arm and points to markings on the first portion identifying the angular position of the arm relative to the base.

9. The device of claim 1, wherein the first retention member is movable along a first track of the base, the first retention member including a first lock configured to lock the first retention member at any suitable position along the first track.

10. The device of claim 1, wherein the second retention member is movable along a second track of the arm, the second retention member including a second lock configured to lock the second retention member at any suitable position along the second track.

11. The device of claim 1, further comprising a platform configured to be positioned adjacent to the arm and support a portion of the wire harness thereon, the platform including rollers on an undersurface thereof.

12. A device configured to measure flexibility of a wire harness, the device comprising:
   a base including a first retention member configured to hold the wire harness;

an arm pivotably connected to the base at a hinge, an axis of rotation of the arm extends along the hinge, the arm including a second retention member configured to hold the wire harness;
an interface mounted to the arm and aligned with the axis of rotation of the arm, the interface configured to cooperate with an actuator such that rotation of the interface by the actuator rotates the arm relative to the base at the hinge and bends the wire harness mounted to the device; and
a gauge including a meter mounted to the base and a pointer mounted to the arm, rotation of the arm relative to the base about the axis of rotation moves the pointer relative to the meter for identification of an angular position of the arm relative to the base corresponding to a degree of bend of the wire harness.

13. The device of claim 12, wherein the interface includes a bolt and the actuator includes a torque wrench.

14. The device of claim 12, wherein:
   the first retention member is movable along a first track of the base, the first retention member including a first lock configured to lock the first retention member at any suitable position along the first track; and
   the second retention member is movable along a second track of the arm, the second retention member including a second lock configured to lock the second retention member at any suitable position along the second track.

15. The device of claim 12, further comprising a platform configured to be positioned adjacent to the arm and support a portion of the wire harness thereon, the platform including rollers on an undersurface thereof.

16. A method for measuring flexibility of a wire harness, the method comprising:
   coupling the wire harness to a base of a device configured to measure flexibility of the wire harness with a first retention member;
   coupling the wire harness to an arm of the device with a second retention member, the arm pivotably connected to the base at a hinge of the device;
   rotating the arm relative to the base to bend the wire harness mounted to the device including increasing a degree of rotation of the arm relative to the base until a force required to rotate the arm and bend the wire harness reaches a predetermined limit; and
   stopping rotation of the arm relative to the base when the force reaches the predetermined limit, and referencing a gauge of the device to identify an angular position of the arm relative to the base corresponding to a degree of bend of the wire harness.

17. The method of claim 16, further comprising rotating the arm relative to the base with an actuator in cooperation with the arm by way of an interface of the arm.

18. The method of claim 17, wherein the interface includes a bolt.

19. The method of claim 17, wherein the actuator includes a torque wrench.

20. The method of claim 19, further comprising identifying the force required to rotate the arm on a meter that measures torque applied to the torque wrench.

* * * * *